United States Patent [19]
Banzhof et al.

[11] Patent Number: 6,163,255
[45] Date of Patent: *Dec. 19, 2000

[54] TIRE VALVE AND ASSOCIATED TIRE PRESSURE SENDING UNIT

[75] Inventors: Frank S. Banzhof, Indian Trail, N.C.; Adrian M. Page, Antrim, United Kingdom; Roberto Rovelli, Pontarlier, France

[73] Assignee: Schrader-Bridgeport International, Inc., Buffalo Grove, Ill.

[*] Notice: This patent is subject to a terminal disclaimer.

[21] Appl. No.: 09/374,411

[22] Filed: Aug. 13, 1999

Related U.S. Application Data

[62] Division of application No. 09/081,898, May 20, 1998, Pat. No. 6,005,480.

[51] Int. Cl.[7] .................................................. B60C 23/00
[52] U.S. Cl. ....................... 340/447; 340/442; 340/445; 73/146.8
[58] Field of Search .................................. 340/447, 442, 340/443, 445; 73/146.2, 146.3, 146.4, 146.8; 200/61.22, 61.25, 61.26

[56] References Cited

U.S. PATENT DOCUMENTS

| | | | |
|---|---|---|---|
| 3,610,269 | 10/1971 | Adams | 137/227 |
| 3,890,595 | 6/1975 | Barabino | 340/442 |
| 4,048,614 | 9/1977 | Shumway | 340/442 |
| 4,686,855 | 8/1987 | Smith | 73/146.8 |
| 4,737,760 | 4/1988 | Huang et al. | 340/447 |
| 4,998,092 | 3/1991 | Ohno et al. | 340/445 |
| 5,040,561 | 8/1991 | Achterholt | 137/227 |
| 5,040,562 | 8/1991 | Achteholt | 137/227 |
| 5,055,826 | 10/1991 | Ballyns | 340/442 |
| 5,083,457 | 1/1992 | Schultz | 73/146.5 |
| 5,142,904 | 9/1992 | Le | 73/146.8 |
| 5,289,161 | 2/1994 | Huang | 340/447 |
| 5,302,939 | 4/1994 | Downs et al. | 340/447 |
| 5,604,481 | 2/1997 | Lin | 340/442 |
| 5,754,101 | 5/1998 | Tsunetomi et al. | 340/442 |
| 5,774,048 | 6/1998 | Achterholt | 340/447 |
| 5,825,285 | 10/1998 | Sawafuji | 340/455 |
| 6,005,480 | 12/1999 | Banzhof et al. | 340/447 |

FOREIGN PATENT DOCUMENTS

43 03 583 A1  8/1994  Germany .

*Primary Examiner*—Daniel J. Wu
*Assistant Examiner*—Toan Pham
*Attorney, Agent, or Firm*—Brinks Hofer Gilson & Lione

[57] ABSTRACT

A snap-in tire valve includes a valve body surrounded in part by a resilient element that forms an annular sealing surface configured to snap in place into a valve opening of a wheel. A tire pressure radio-frequency sending unit is mounted to the valve body, and a column extends from the sending unit. The region between the resilient element and the pressure sending unit defines an expansion volume that receives displaced portions of the resilient element during snap-in insertion of the valve body into a wheel opening, thereby facilitating insertion. Preferably the column defines a central passageway to facilitate insertion using standard insertion tools. In one version, two batteries are included in the sending unit, disposed on opposite sides of the column.

17 Claims, 7 Drawing Sheets

TIRE VALVE AND ASSOCIATED TIRE PRESSURE SENDING UNIT

This application is a division of application Ser. No. 09/081,898, filed May 20, 1998 now U.S. Pat. No. 6,005,480, which is hereby incorporated by reference in its entirety.

BACKGROUND

The present invention relates to remote tire pressure sensing systems, and in particular to radio frequency pressure sending units mounted on a tire valve.

DE OS 43 03 583 discloses a snap-in tire valve that includes a tire pressure sending unit mounted on the inner end of the tire valve. The sending unit is received inside an enlarged end of the body of the valve. This enlarged end extends over a substantial portion of the diameter of the valve, and the position of the enlarged end is anticipated to have an adverse effect on the movement of elastomeric material as the tire valve is snapped in place in the valve opening of the wheel.

SUMMARY

The present invention is directed to an improved tire valve that includes a tire pressure sending unit mounted on the tire valve itself.

By way of introduction, the preferred embodiments described below include a load-bearing element such as a tubular column that extends between the sending unit and the valve body. Preferably, the sending unit includes at least two batteries that are disposed on respective sides of the load-bearing element to provide an advantageous center of mass for the tire valve/sending unit combination portion of the valve are shaped to form an expansion volume therebetween. This expansion volume is disposed radially outwardly from the column and is characterized by a sufficient volume to facilitate insertion of the tire valve into the valve.

The foregoing discussion of the preferred embodiments has been provided only by way of introduction. Nothing in this section should be taken as a limitation on the following claims, which define the scope of the invention.

DETAILED DESCRIPTION OF THE PRESENT PREFERRED EMBODIMENTS

Figure 1:
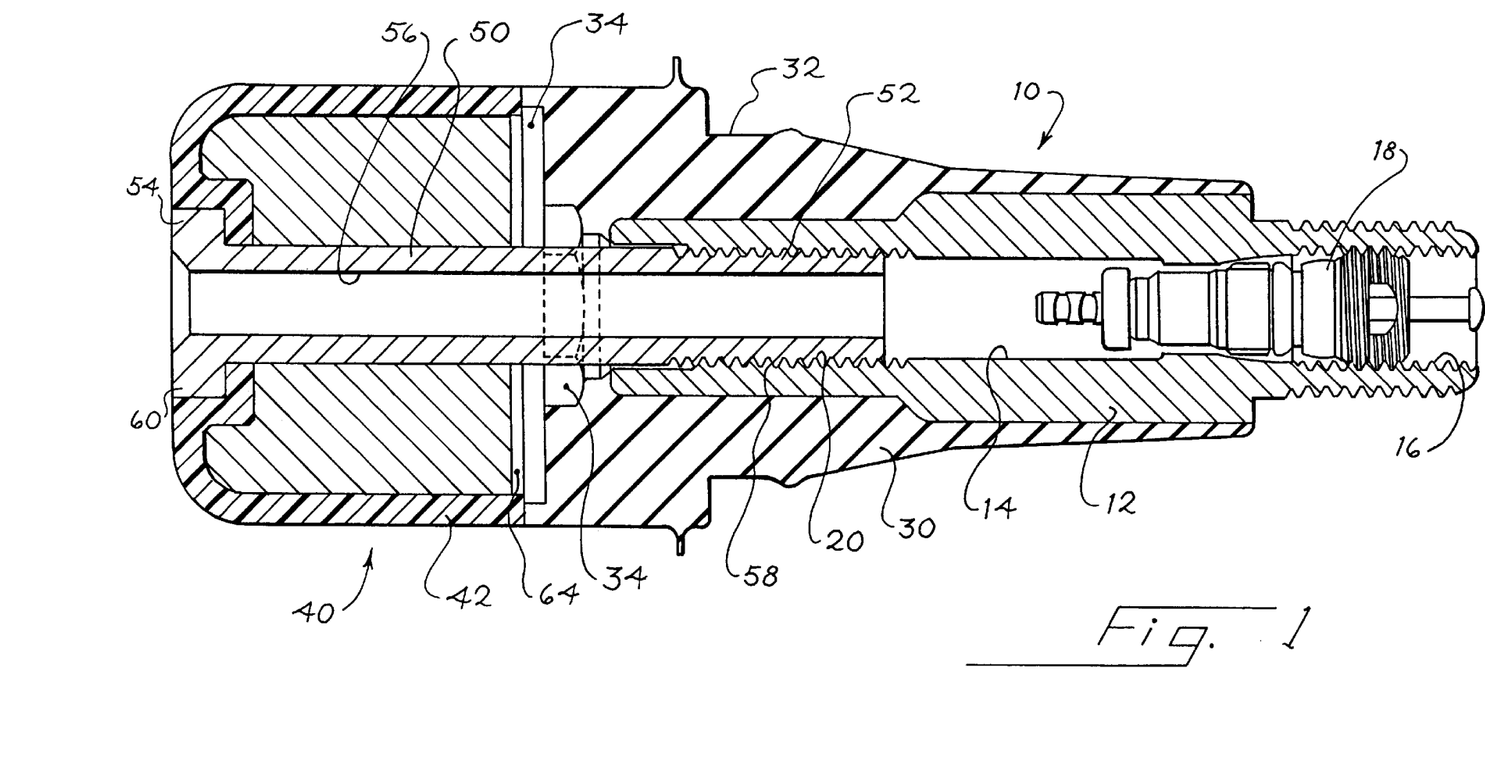
FIG. 1 is a longitudinal sectional view of a snap-in tire valve that incorporates a first preferred embodiment of this invention.

Turning now to the drawings, FIG. 1 is a sectional view of a snap-in tire valve 10 that incorporates a presently preferred embodiment of this invention. The valve 10 includes a rigid valve body 12 that defines a passageway 14 extending therethrough. The passageway 14 includes an outer portion 16 that is threaded to receive a conventional valve core 18, and a threaded inner portion 20.

The valve body 12 is in part surrounded by a resilient element 30 formed of an elastomeric material. The resilient element 30 includes an annular sealing surface 32 shaped to seal the resilient element 30 and therefore the valve 10 against the valve opening of a wheel (not shown). The end of the resilient element 30 opposite the valve core 18 defines an expansion volume 34. In this embodiment, the expansion volume 34 takes the form of a void or gap in the resilient element 30.

Figures 3, 4:
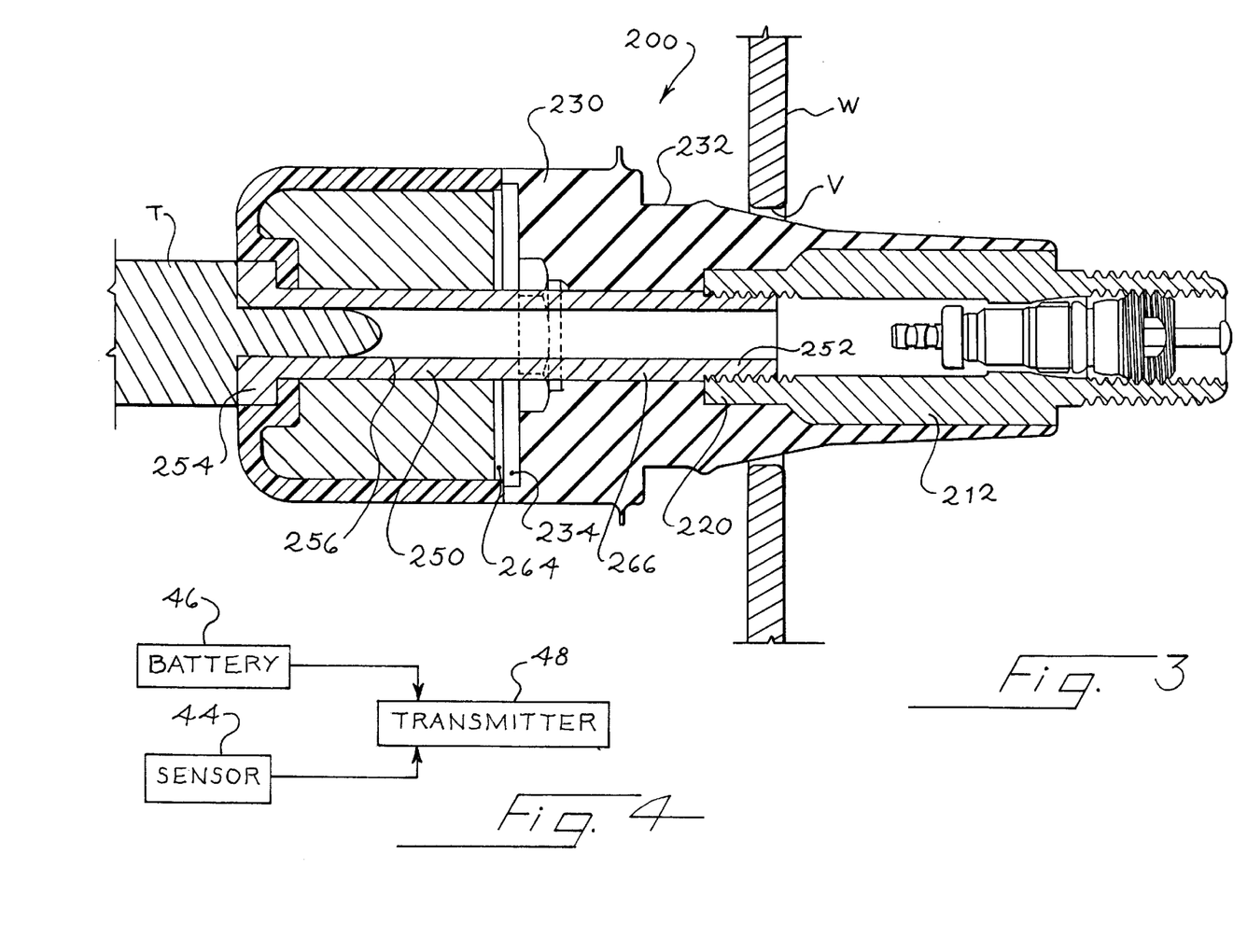
FIG. 3 is a longitudinal sectional view of a snap-in tire valve that incorporates a third preferred embodiment of this invention.
FIG. 4 is a block diagram of a tire pressure sending unit suitable for use in the embodiments of FIGS. 1–3.

A pressure sending unit 40 is secured to the valve 10. This pressure sending unit 40 includes a housing 42 that is generally cylindrical in outside shape, and that defines a central, axially oriented opening. Contained within the housing 42 are a pressure sensor 44, a battery 46 and a radio frequency transmitter 48, as shown in FIG. 4. The pressure sensor 44 develops a pressure signal indicative of air pressure adjacent to the pressure sending unit 40 (typically the air pressure of the tire surrounding the wheel to which the valve 10 is mounted). This pressure signal is processed by the transmitter 48, which is powered by the battery 46. The radio frequency transmitter 48 transmits radio frequency signals indicative of pressure sensed by the sensor 44. The various electronic components of the pressure sending unit 40 can be potted in place in the housing 42 in the conventional manner. The pressure sending unit 40 defines an additional expansion volume 64 in the end of the pressure sending unit 40 positioned adjacent to the resilient element 30.

The pressure sending unit can take many forms, depending upon the application. For example, the pressure sending unit can provide threshold information, simply indicating whether the air pressure sensed by the sensor 44 is greater than or less than a threshold value. Alternatively, the sending unit 40 can transmit radio signals indicating the level of the sensed pressure. For example, pressure information may be digitally encoded as described in U.S. Pat. No. 5,600,301, assigned to the assignee of the present invention. Alternatively, pressure can be encoded in the carrier frequency used by the RF transmitter as disclosed in U.S. Pat. No. 5,661,651. Many other approaches can be used for the pressure sending unit 40, and in general any suitable measurement and radio frequency transmission techniques can be used, as long as the pressure sending unit 40 provides a radio signal indicative in some manner of the sensed pressure.

The pressure sending unit 40 is secured to the valve body 12 by a tubular column 50 that acts as a load-bearing element. Column 50 includes a threaded inner end 52 and an enlarged outer end 54. A passageway 56 extends completely through the column 50 and provides an extension of the passageway 14 of the valve body 12. The inner end 52 of the column 50 is releasably secured to the inner portion 20 of the valve body 12 by a threaded connection 58. The outer end 54 of the column 50 forms an enlarged head 60 that is received in a recess in the housing 42. For example, the enlarged head 60 can be serrated and pressed in place in the housing 42 such that the exterior surface of the housing 42 can be used to rotate the column 50 in order to screw the column 50 into and unscrew the column 50 from the valve body 12.

Figure 2:
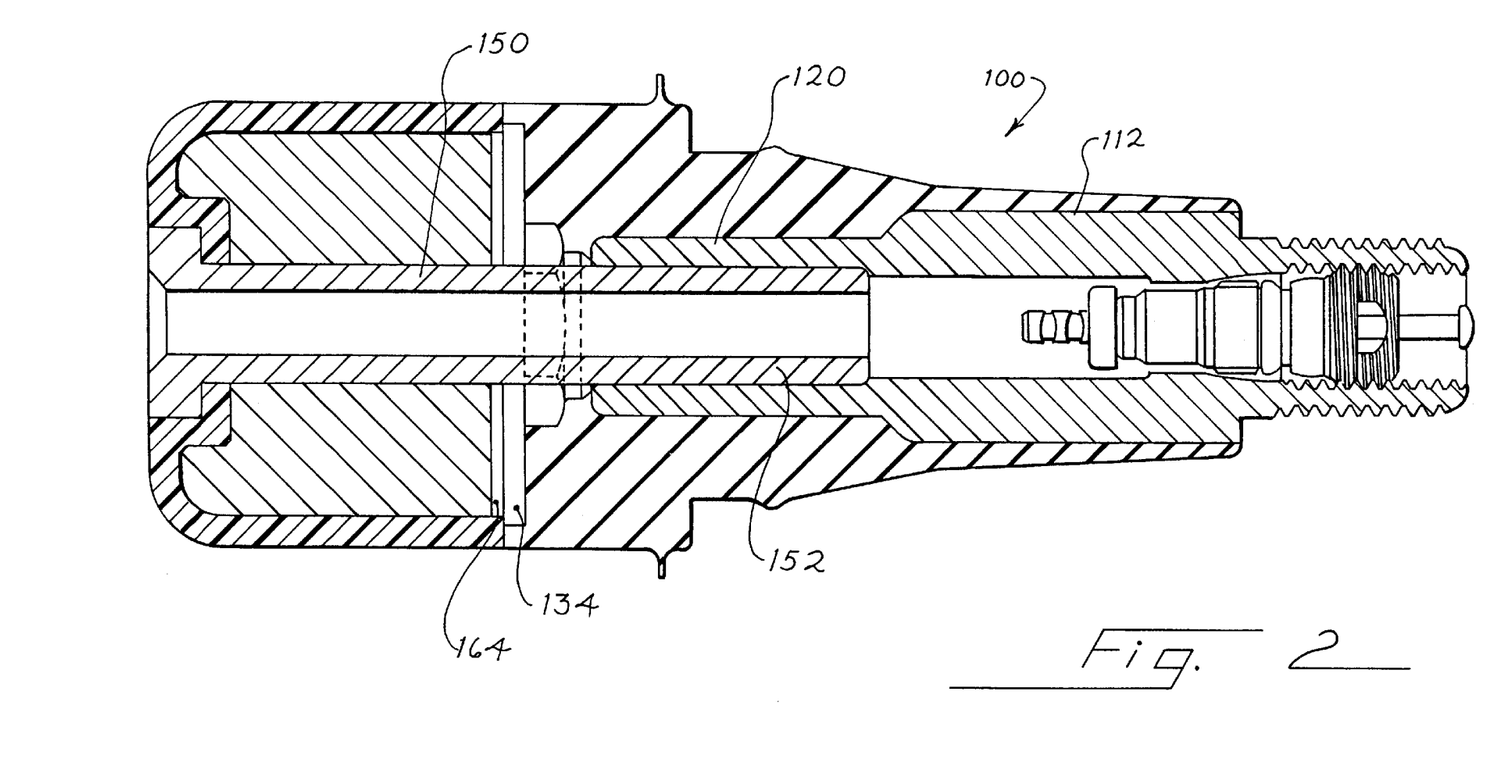
FIG. 2 is a longitudinal sectional view of a snap-in tire valve that incorporates a second preferred embodiment of this invention.

FIG. 2 shows a valve 100 that incorporates a second preferred embodiment of this invention. The valve 100 is quite similar to the valve 10 described above, except for the manner in which the column 150 is secured to the valve body 112. In this example, the inner portion 120 of the valve body 112 is smooth walled, as is the inner end 152 of the column 150. The elements 120, 152 are sized such that the inner end 152 is received within the inner portion 120 in a press fit. Preferably, the press fit is sufficiently snug that the column 150 is not easily removable from the valve body 112 after initial assembly. If desired, the inner end 152 may be knurled to enhance the frictional engagement between the column 150 and the valve body 112.

FIG. 3 shows a snap-in tire valve 200 that incorporates a third preferred embodiment of this invention. The valve 200 is quite similar to the valve 10 of FIG. 1 except that in this case the inner portion 220 terminates near the outer edge of the sealing surface 232. The inner end 252 of the column 250 is a threadedly received in the inner portion 220 of the valve body 212. An intermediate portion 266 of the column 250 is in direct frictional contact with the resilient element 230 in the plane of the annular sealing surface 232.

Figure 5:
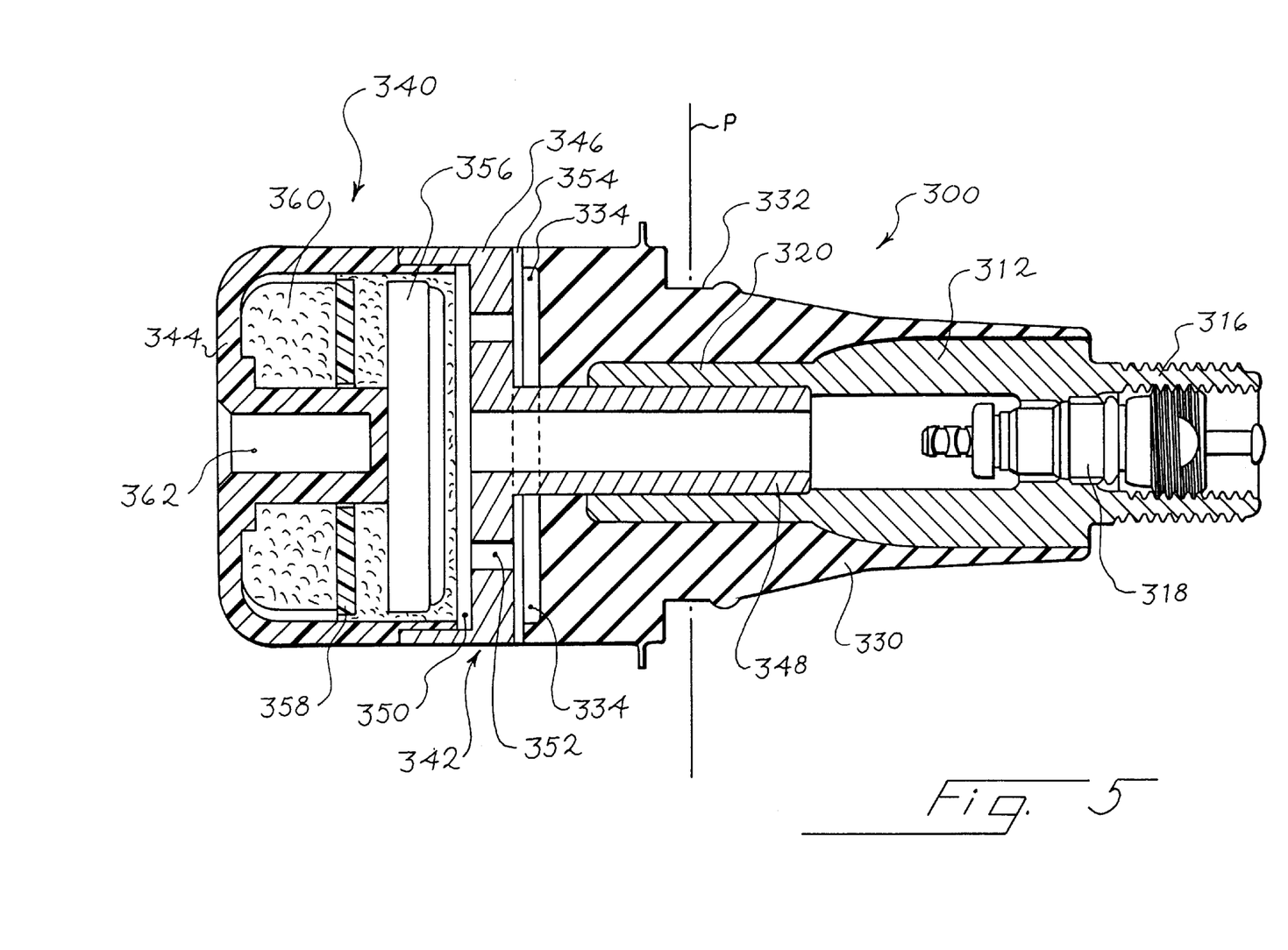
FIG. 5 is a longitudinal sectional view of a snap-in tire valve that incorporates a fourth preferred embodiment of this invention.

FIG. 5 shows a snap-in tire valve 300 that incorporates a fourth preferred embodiment of this invention. The valve 300 is quite similar to the valve 100 of FIG. 2, with the exceptions described below.

The valve 300 includes a valve body 312 that has an outer end 316 that supports a valve core 318 and an inner end 320. The valve body 312 is surrounded by and bonded to a resilient element 330 which defines an annular sealing surface 332. A reference plane P passes through the center of the annular sealing surface 332. The innermost end of the resilient element 330 defines an expansion volume 334.

A tire pressure sending unit 340 is included in the valve 300, enclosed in a housing 342. This housing 342 includes an outer part 344 and an inner part 346. The inner part 346 supports a cylindrical, hollow neck or load-bearing element 348 that is press-fit in place in the inner end 320 of the valve body 312. The outer part 344 supports a radio frequency transmitter that is mounted on a printed circuit board 358 and is powered by a battery 356. A potting material 360 fills the voids in the outer part 344.

Air passing through the valve body 312 passes through the neck 348, via a gap 350 and openings 352 to a vent path 354 formed between the sending unit 340 and the resilient element 330.

The outer part 344 defines a recess 362 sized to receive a conventional valve insertion tool. Because this recess passes only partly through the sending unit 340, an uninterrupted volume is provided to receive the battery 356. This facilitates use of a conventional coin battery.

The valve 300 is weighted to reduce any tendency of the valve 300 to rotate out of the desired position in the wheel in use, and to reduce associated sealing problems. This is accomplished by dimensioning the valve body 312 such that the center of mass of the valve 300 is positioned on the same side of the plane P as the valve core 318. By weighting the valve 300 in this way, centrifugal forces on the valve 300 associated with high speed rotation of the wheel on which the valve is mounted have a reduced tendency to cause the valve 300 to rotate out of the desired position in the wheel. Such rotation can cause leakage problems and is to be minimized where possible. The thickness and length of the valve body 312 can be adjusted as necessary to ensure that the center of mass of the tire valve 300 (including the sending unit 340) is properly positioned with respect to the reference plane P.

Figure 6:
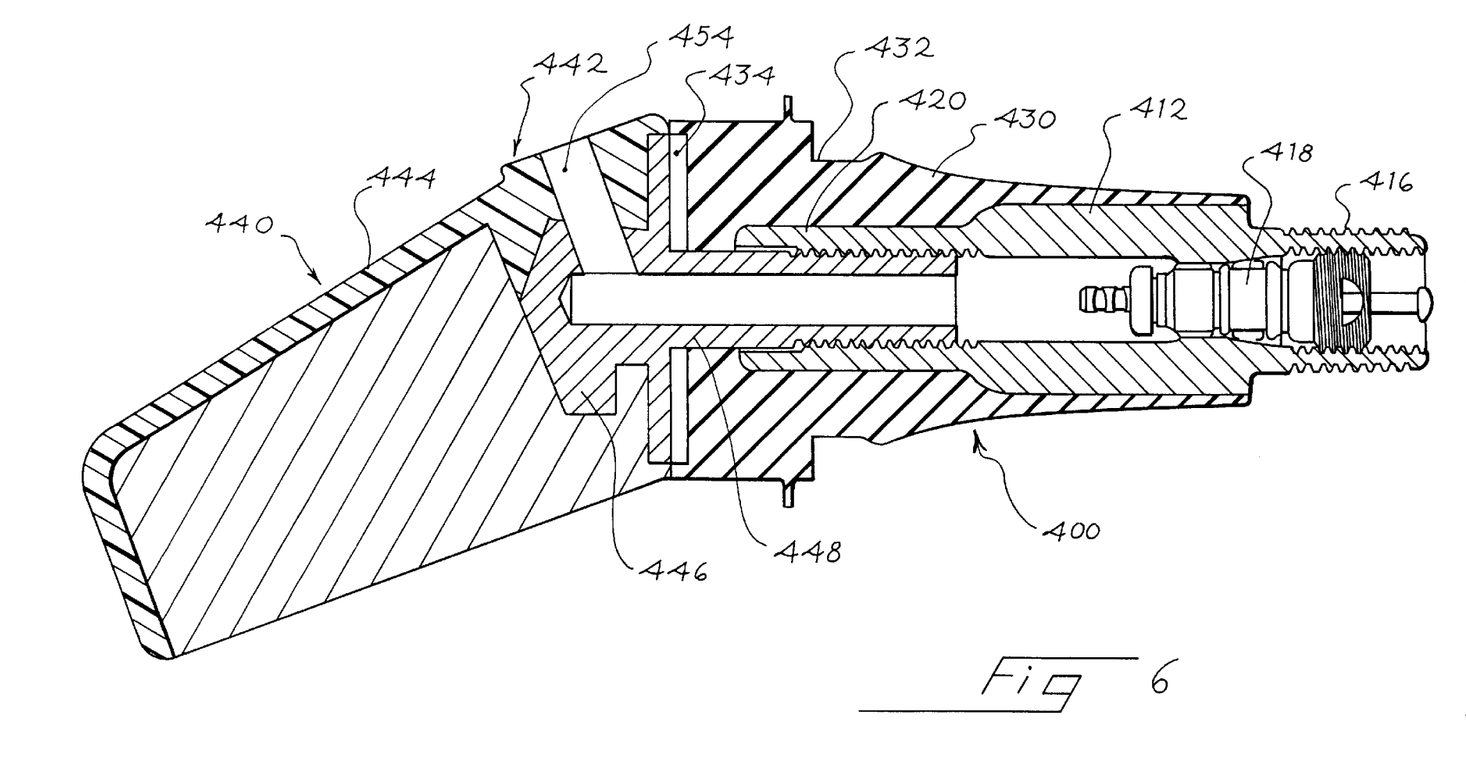
FIG. 6 is a longitudinal sectional view of a snap-in tire valve that incorporates a fifth preferred embodiment of this invention.

FIG. 6 shows a snap-in valve 400 that incorporates a fifth preferred embodiment of this invention. The valve 400 is similar to the valve 10 described above, except for the configuration of the pressure sending unit. The valve 400 includes a valve body 412 that supports a valve core 418 in its outer end 416, and that includes a threaded inner end 420. The valve body 412 is surrounded by a resilient element 430 that defines an annular sealing surface 432 and forms an expansion volume 434.

The tire pressure sending unit 440 of this embodiment includes a housing 442 that is made up of an outer part 444 and an inner part 446. The inner part 446 includes a neck or load-bearing element 448 that is threadedly connected to the inner end 420 of the valve body 412. The pressure sending unit 440 includes any suitable radio-frequency sending unit, such as a tire pressure sending unit, or a sending unit that transmits a unique identifying code associated with the tire valve 400 and therefore with the wheel in which the tire valve is mounted. Air passing in and out of the tire valve 400 is vented to the interior of the tire via a vent path 454.

In the tire valve 400 the sending unit 440 is not generally cylindrical in shape. Rather, it has been shaped as appropriate for efficient packaging of the particular radio frequency transmitter and battery selected for the application.

Figures 7, 9:
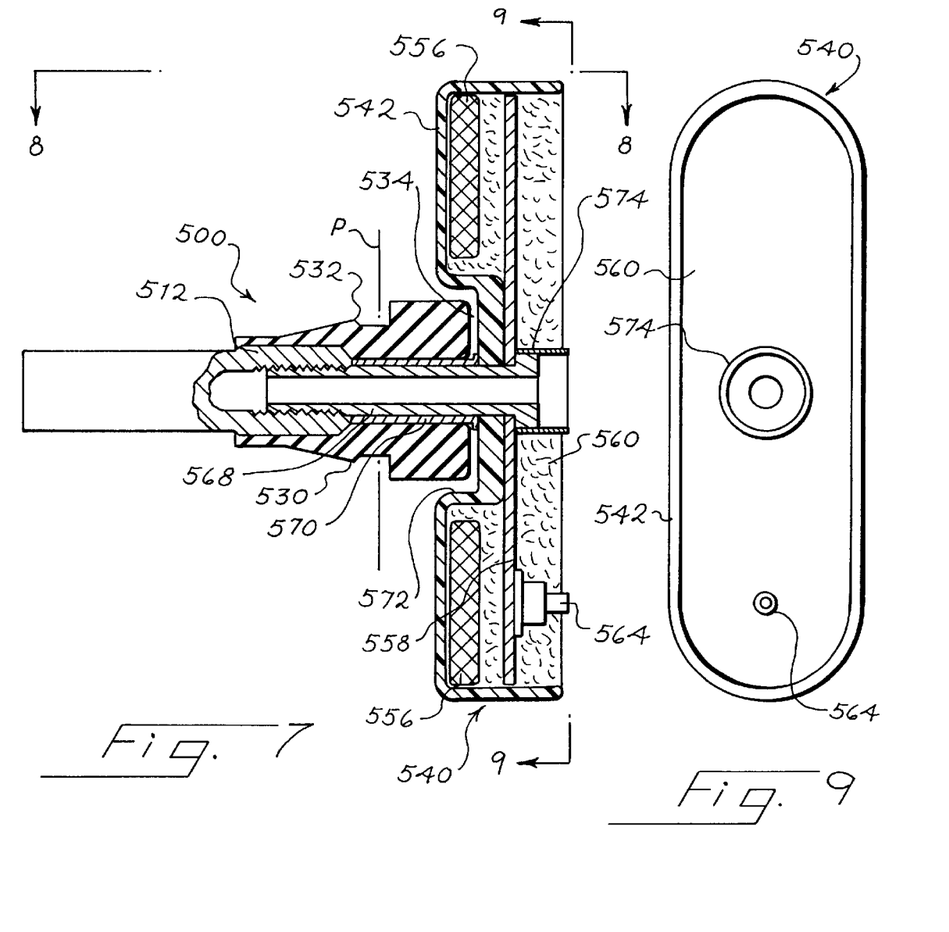
FIGS. 7–9 are partial sectional, side and rear views, respectively, of a snap-in tire valve that incorporates a sixth preferred embodiment of this invention.
Figure 8:
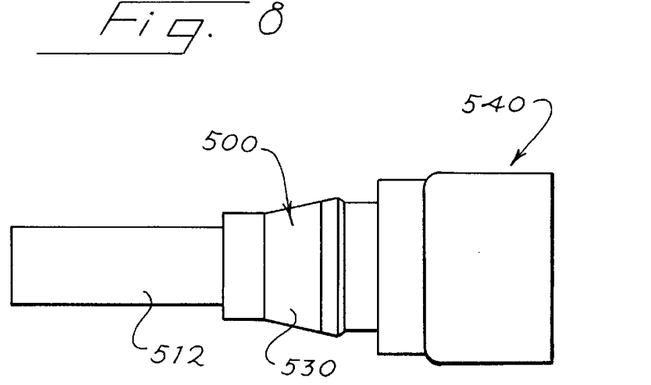

FIGS. 7–9 show various views of a sixth preferred embodiment of this invention, which includes a tire valve 500 having a valve body 512 at least partially surrounded by a resilient element 530. The resilient element 530 defines an annular sealing surface 532 as described above. In general, the resilient element 530 is shaped as appropriate for a snap-in valve.

The tire valve 500 also includes a radio-frequency tire pressure sending unit 540 that is contained within an outer plastic housing 542. An expansion volume 534 is defined between the sending unit 540 and the rear or inner end of the resilient element 530. As is best shown in FIG. 7, the sending unit 540 includes two batteries 556, that in this embodiment are conventional coin batteries. The batteries 556 are mounted at opposite ends of a printed circuit board 558 that fits within the housing 542. A potting material 560 such as a conventional epoxy resin fills the spaces of the housing 542 around the batteries 556, the printed circuit board 558, and related components. As shown in FIG. 7, the sending unit 540 includes a pressure sensor 564 that defines a plastic tube that projects through the surface of the potting material 560 and prevents the potting material 560 from rendering the pressure sensor inoperative.

The sending unit 540 includes a load-bearing element such as a screw 568 that passes through an opening in the printed circuit board 558 and an opening in the housing 542. This screw 568 is threaded into the valve body 512. A tubular spacer 570 bears at one end on the housing 542 and at the other end on the valve body 512 to insure that the expansion volume 534 is preserved as the screw 568 is tightened. The housing 542 defines a recess 572 that receives a portion of the inner end of the resilient element 330. A potting dam 574 is installed on the printed circuit board 558 to prevent the potting material 560 from flowing over the screw 568.

As illustrated, the screw 568 defines a hollow bore passing therethrough. This bore is in fluid communication with the central passageway of the valve body 512 and is used to pass air into and out of the tire valve 500.

The spacer 570 and the screw 568 can be considered part of the sending unit 540, and it is the cooperation of the screw 568, the spacer 570, the housing 542, and the resilient element 530 that defines and preserves the expansion volume 534.

In this example only two batteries 556 are used, though more batteries could be used in other embodiments. The two batteries are disc shaped and mounted in the same plane. Each of the batteries 556 is positioned on a respective, diametrically-opposed side of the screw 568, as best shown in FIG. 7. In this case the housing 542 is elongated, and it defines a length that is more than two times greater than its width. In this example, the length is about three times the width of the housing.

The arrangement of the sending unit 540 described above provides the advantage that the center of gravity of the sending unit 540 is closely adjacent to the plane P that passes through the center line of the annular sealing surface 532. For this reason, the center of gravity of the entire tire valve 500, including the sending unit 540, is positioned to the outside of the plane P. That is, the center of gravity of the tire valve 500 is on the same side of the plane P as is the valve core.

Figure 10:
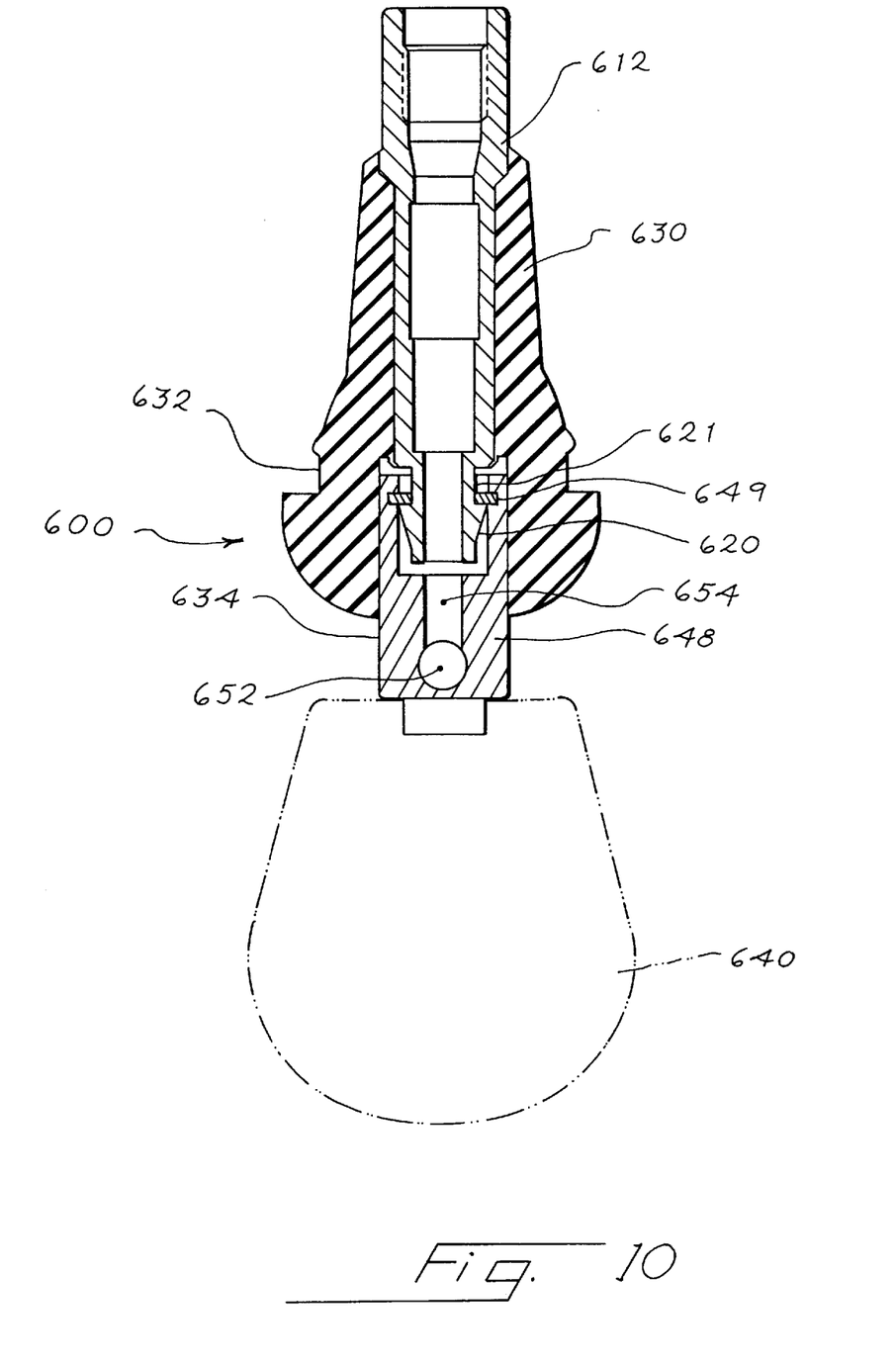
FIG. 10 is a longitudinal sectional view of a seventh preferred embodiment of this invention.

FIG. 10 shows a cross-sectional view of a tire valve 600 that includes a valve body 612 partially surrounded by a resilient element 630. As before, the resilient element 630 defines an annular sealing surface 632 and is suited for snap-in installation into a wheel rim. The inner end of the valve body 612 defines a conical portion 620 and a groove 621.

A sending unit 640 is mounted to the end of a neck or load bearing element 648 that is shaped to receive the conical end 620. The load bearing element 648 carries a clip ring 649 which may be a split ring of the type sold by Seeger under the trade name Circlip. The load bearing element 648 also defines a central passageway 654 that terminates in a cross bore 652. The load bearing element 648 is dimensioned to ensure that an expansion volume 634 is created between the sending unit 640 and the inner end of the resilient element 630.

The sending unit 640 can be installed on the tire valve 600 simply by pressing the load bearing element 648 against the conical portion 620 of the valve body 612. The conical portion opens the ring 649 until the ring 649 snaps into the groove 621 thereby securing the sending unit 640 to the valve body 612.

All of the valves 10, 100, 200, 300, 400, 500, 600 are designed to facilitate snap-in insertion of the valve in the valve opening of a wheel. By way of example, when the valve 200 of FIG. 3 is snap fit in a valve opening V of a wheel W, an insertion tool T is inserted into the outer end 254 of the column 250, and the tool T is used to push the valve 200 through the valve opening V of the wheel W. The valve opening V has a diameter smaller than the rest diameter of the annular sealing surface 232, and the resilient element 230 therefore must be deformed to install the valve 200 in place in the opening V. This desired deformation is facilitated by the expansion volumes 234, 264. In particular, axial forces applied to the column 250 by the tool T are transmitted to the valve body 212. The valve body 212 is secured to the forward portion of the resilient element 230, and the axial insertion forces cause the resilient element 230 to be stretched. Force is applied to the resilient element 230 by the wheel W to cause the elastomeric material of the resilient element 230 to deform into the expansion volumes 234, 264. The expansion volumes 34, 64; 134, 164; 234, 264; 334; 434; 534; 634 preferably have a volume greater than 150 mm$^3$, more preferably greater than 300 mm$^3$, and most preferably about 450 mm$^3$. The expansion volumes 34, 64; 134, 164; 334; 434; 534; 634 provide similar advantages in the valves 10, 100, 300, 400, 500, 600 respectively.

The threaded connection of the valve 200 between the column 250 and the valve body 212 extends on the side of the annular sealing surface 232 on which the valve core 218 is positioned. When the valve 200 is mounted in place in the wheel W, compressive force is applied by the wheel W to the annular sealing surface 232 to compress the resilient element 230 against the intermediate portion 266 of the column 250. These compressive forces create friction that resists rotation of the column 250 with respect to the resilient element 230 and the body 212, and thereby resists unintended loosening of the column 250 during use.

As yet another advantage, because the column 250 is provided with a passageway 256, conventional insertion tools T can be inserted into the column 250 to facilitate automatic insertion of the valve 200 into the wheel W.

The preferred embodiments described above can be fabricated using conventional materials for the valve body, the resilient element, and the housing. As pointed out above, the pressure sending unit can take any suitable form, and a wide variety of valve cores can be used.

The preferred embodiments described above are intended to be low cost, low weight valves that fit all wheels, and that are readily snapped in place with conventional insertion equipment in some cases.

It should be apparent from the foregoing that improved snap-in tire valves have been provided that facilitate automatic snap-in insertion of the valve into a wheel of a vehicle. The expansion volumes described above provide room for resilient material to flow during the insertion process, and some of the sending units facilitate insertion using standard inserting tools. In some embodiments, the pressure sending unit can be removed from the valve body to allow the valve body and the resilient element to be replaced and the pressure sending unit to be reused. In these cases, compressive forces applied to the resilient element by the wheel can be utilized to reduce or eliminate unwanted loosening of the sending unit from the remainder of the valve. When the pressure sending unit is generally cylindrical and rigidly attached to the rear of the valve, conventional inserting tools can be used, thereby minimizing installation costs while providing all of the advantages of a tire valve having an integrated pressure sending unit.

Of course, many changes and modifications can be made to the preferred embodiments described above. Materials, dimensions and proportions can be selected as suitable for the intended application. Details of construction regarding the pressure sending unit, the resilient element, the valve body and other elements of the valve can all be adapted as appropriate for the particular application. If desired, the valve body of the valve can be electrically connected to the transmitter of the pressure sending unit to operate as an antenna. A thread lock adhesive can be used in the threaded embodiments. The sending unit may transmit other parameters instead of or in addition to tire pressure, such as an identification number, temperature, or the like. The sending unit of FIGS. 7–9 can be used with any suitable tire valve, including clamp-in valves.

By way of example, the expansion volumes described above can be partially or completely filled with compressible materials, such as foams or the like, and they do not have to be completely empty of material as shown in the drawings. Also, two or more separate volumes can be used. The expansion volumes can be shaped as desired, and the expansion volume can be defined entirely by the resilient element, entirely by the sending unit, or by an intermediate element interposed between the resilient element and the pressure sending unit. As another alternative, the sending unit can be molded in place in the resilient element, thereby eliminating the need for either a screw connection or a press fit connection. As shown above, it is not required in all embodiments that the sending unit be shaped to receive the pin of an insertion tool. Instead, the insertion tool can be designed to engage the peripheral portion of the housing, if desired.

The foregoing detailed description has described only a few of the many forms that the present invention can take. For this reason, it is intended that this detailed description be regarded as an illustration, and not as a definition of the invention. It is only the following claims, including all equivalents, that are intended to define the scope of this invention.

What is claimed is:

1. A tire pressure sending unit comprising:
   a housing;
   at least two batteries and a radio-frequency transmitter disposed in the housing, said transmitter powered by the batteries and operative to send a radio-frequency signal;
   a load-bearing element extending from the housing and adapted to secure the housing to a tire valve;
   said batteries each disposed on a respective side of the load-bearing element.

2. The invention of claim 1 wherein the batteries comprise first and second batteries disposed on diametrically opposite sides of the load-bearing element.

3. The invention of claim 2 wherein the housing comprises a length and a width, and wherein the length is more than two times greater than the width.

4. The invention of claim 3 wherein the length is about three times the width.

5. The invention of claim 3 wherein the housing comprises a recess around the load-bearing element, said recess sized to receive a rear portion of a tire valve.

6. The invention of claim 2 wherein each of the batteries is shaped as a respective disc.

7. The invention of claim 6 wherein the batteries are disposed in common plane.

8. A tire valve comprising:
   a valve body defining a passageway comprising inner and outer portions, said outer portion adapted to receive a valve core;
   a tire pressure sending unit mounted to the valve body and comprising a radio frequency transmitter and at least two batteries, said transmitter powered by the batteries and operative to send a radio frequency signal;
   said valve body defining a longitudinal axis, and said batteries each disposed on a respective side of the longitudinal axis to reduce maximum separation of any of the batteries from the outer portion of the passageway.

9. The invention of claim 8 wherein the tire valve comprises a valve core positioned in the outer portion of the passageway, wherein the tire valve comprises a mounting portion configured to align with an opening in a wheel when the tire valve is mounted to the wheel, and wherein a center of gravity of the tire valve is on the same side of the mounting portion as is the valve core.

10. The invention of claim 9 wherein the sending unit comprises a length and a width, and wherein the length is more than two times greater than the width.

11. The invention of claim 10 wherein the length is about three times the width.

12. The invention of claim 10 wherein the sending unit comprises a recess sized to receive a rear portion of the valve body.

13. The invention of claim 12 wherein a plane passing through the valve body transversely to the longitudinal axis passes through each of the batteries.

14. The invention of claim 8 wherein the batteries comprise first and second batteries disposed on diametrically opposite sides of the longitudinal axis.

15. The invention of claim 14 wherein each of the batteries is shaped as a respective disk.

16. The invention of claim 15 wherein the batteries are disposed in a common plane oriented substantially transverse to the longitudinal axis.

17. The invention of claim 16 wherein the transmitter comprises a printed circuit board, and wherein the batteries are positioned on the same side of the printed circuit board as is the outer portion of the passageway.

* * * * *

UNITED STATES PATENT AND TRADEMARK OFFICE
CERTIFICATE OF CORRECTION

PATENT NO. : 6,163,255 Page 1 of 1
APPLICATION NO. : 09/374411
DATED : December 19, 2000
INVENTOR(S) : Frank S. Banzhof et al.

It is certified that error appears in the above-identified patent and that said Letters Patent is hereby corrected as shown below:

In The Claims

Claim 7, line 2, insert --a-- before "common".

Insert Claim 18 as follows.

--18. The invention of Claim 6 wherein the batteries are disposed in a common plane.--

Signed and Sealed this

Eighteenth Day of March, 2008

JON W. DUDAS
*Director of the United States Patent and Trademark Office*